Oct. 1, 1946.        J. L. HAIGHT, JR        2,408,554
INTERNAL-COMBUSTION ENGINE
Filed April 21, 1945        4 Sheets-Sheet 1

INVENTOR
John Lewis Haight Jr.

Oct. 1, 1946.  J. L. HAIGHT, JR  2,408,554
INTERNAL-COMBUSTION ENGINE
Filed April 21, 1945    4 Sheets-Sheet 2

INVENTOR
John Lewis Haight, Jr.

Oct. 1, 1946.     J. L. HAIGHT, JR     2,408,554
INTERNAL-COMBUSTION ENGINE
Filed April 21, 1945      4 Sheets-Sheet 4

INVENTOR
John Lewis Haight, Jr.

Patented Oct. 1, 1946

2,408,554

UNITED STATES PATENT OFFICE 2,408,554

INTERNAL-COMBUSTION ENGINE

John Lewis Haight, Jr., Fort Worth, Tex.

Application April 21, 1945, Serial No. 589,601

12 Claims. (Cl. 123—56)

This invention relates to internal combustion engines and particularly to internal combustion engines of the two-cycle type. Principal objectives of this invention are maximum operational efficiency, including improved horsepower-to-weight and fuel consumption-to-horsepower ratios, and utilization of any type of liquid fuel. Means of attaining principal and subsidiary objectives are revealed in the following description of the basic unit of the invention offered by way of example. The description will refer to the accompanying drawings in which:

Figure 7 is a front view of injector and acceleration pump showing cam detail and arrangement of fuel supply and outlet ducts.

Figure 8 is an enlarged view of valve which appears in Figures 2 and 7.

Figure 1:
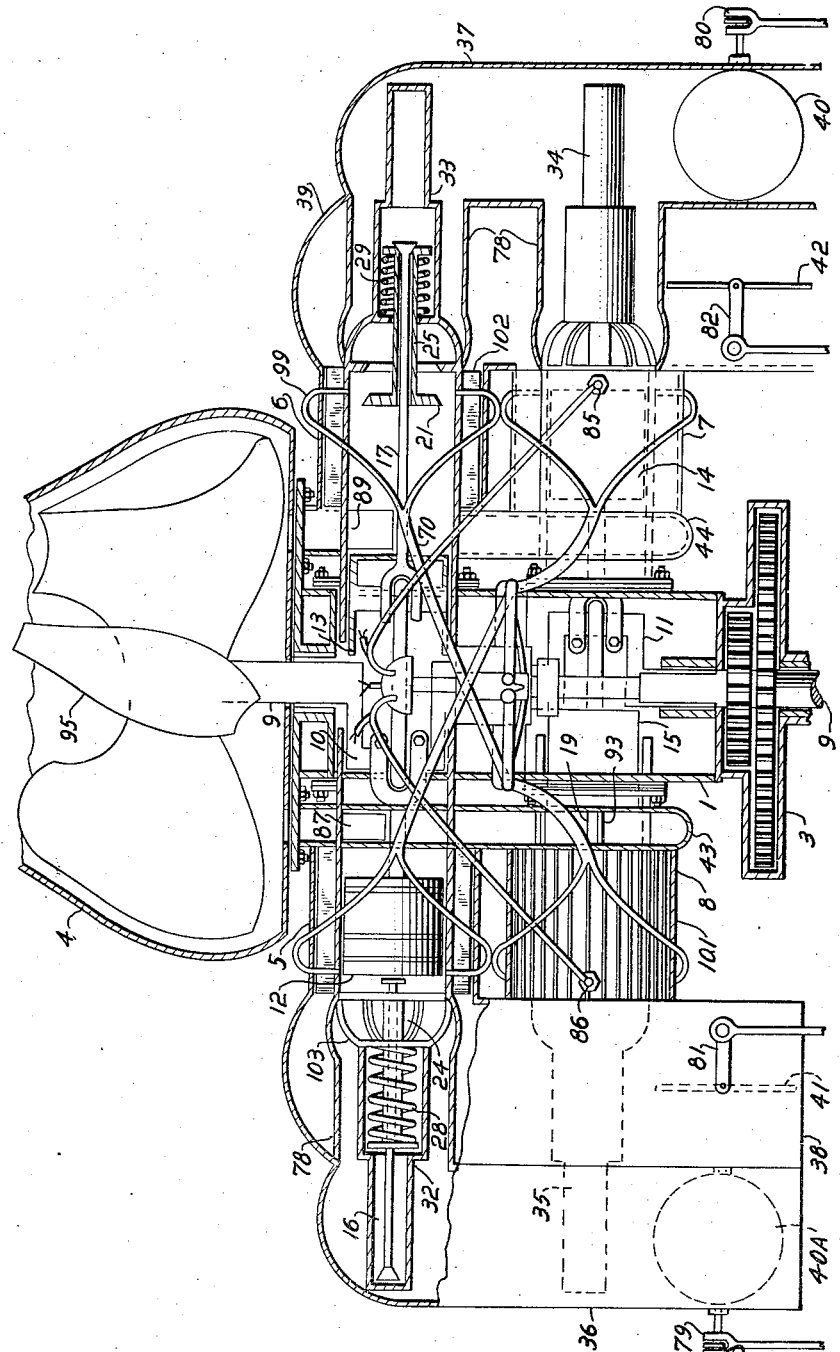
Figure 1 is a plan view, partly broken away, of an engine in accordance with the invention.
Figure 2:
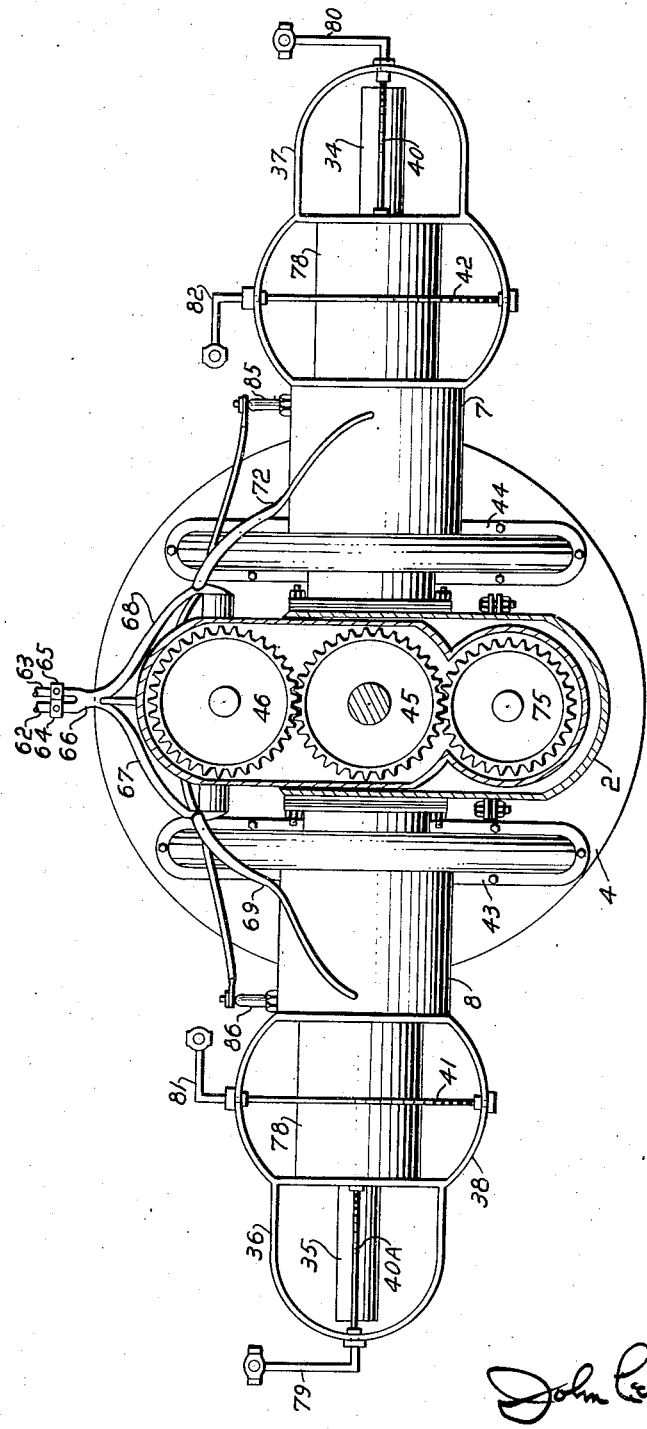
Figure 2 is a front elevation with flywheel and case removed.
Figure 3:
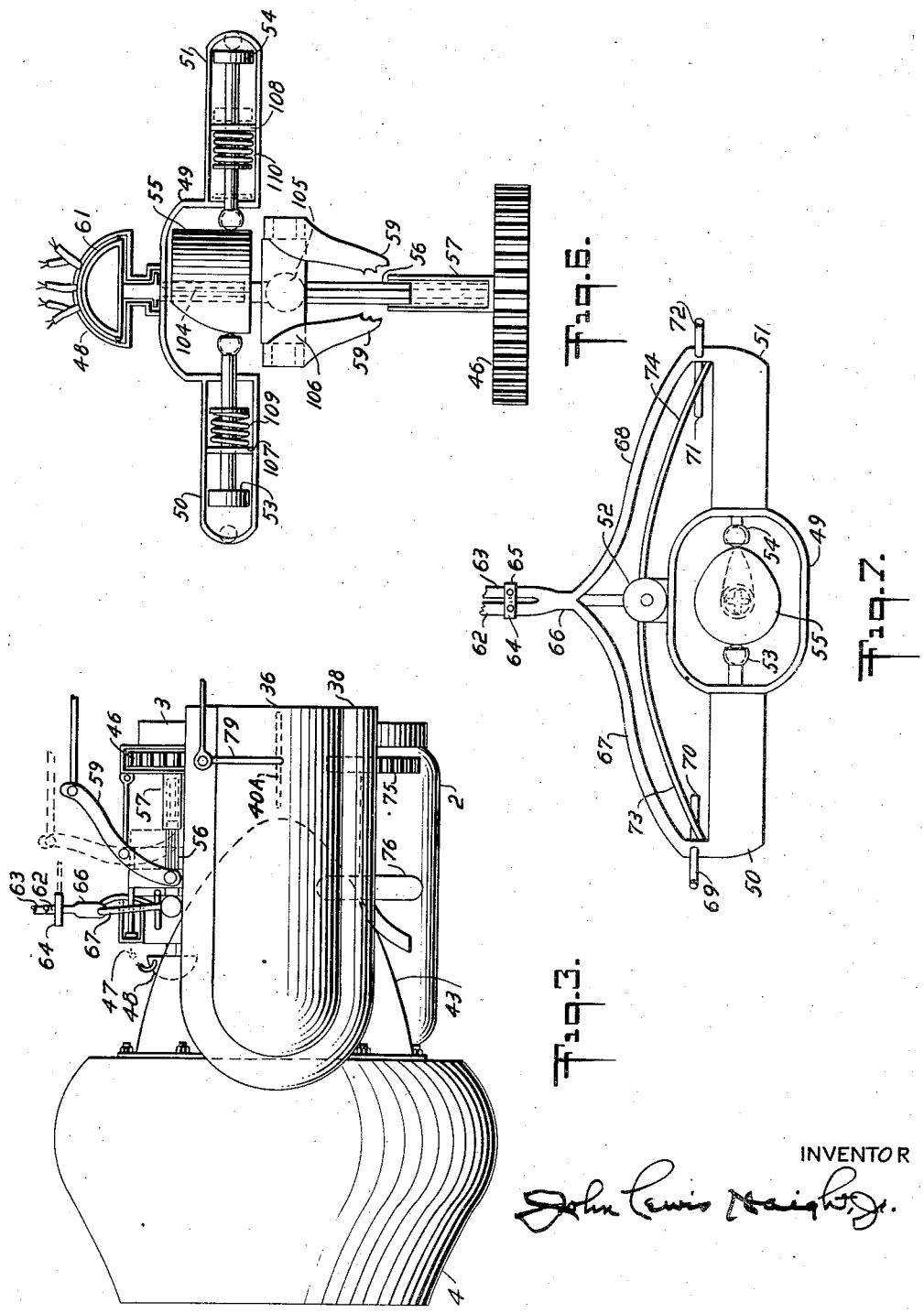
Figure 3 is a side elevation with parts broken away.

Referring first to Figures 1, 2, and 3, reference numeral 1 designates a crankcase to which is affixed an oil pan 2, gear-case 3, fan case 4, cylinders 5, 6, 7, and 8, and injector-distributor 47. Fitted in the three bearing portions of crankcase 1 is the crankshaft 9 having cranks 10 and 11 with connecting rods, arranged as shown in drawings, Figure 1, to pistons 12, 13, 14 and 15. Drilled push rods 16, 17, 18, and 19, each divided and joined at center of piston heads, centrally intraverse the valves 20, 21, 22 and 23 and their integrant tubular stems with conically depressed disks designated by reference numerals 24, 25, 26, and 27. Valve tension is provided by springs 28, 29, 30, and 31 which bear upon the disks of 24, 25, 26, and 27 and the heads of cages, designated by the generic reference numeral 103, superposed on cylinder heads of 5, 6, 7, and 8. Numerals 32, 33, 34 and 35 designate the bidiametric cylinders enclosing operational area of push rods, valve stems and springs above cages.

Air scoops 36 and 37 collect air for scavenging air, carburetion, and interior cylinder cooling, and are fitted with butterfly valves 40 and 40A for control of intake. Air from 36 and 37 is conducted to the cages 103 by cylindrical shells generically designated by numeral 78. Interposed between 36 and 37 and cylinder heads are air scoops 38 and 39, fitted with valves 41 and 42, and having shells which envelope (101) each cylinder and its complement of radiating longitudinal fins, generically designated by numeral 102, and merge into the conduits 43 and 44 which convey both exhaust gases and air employed for cooling and scavenging to the fan case 4. A powerful fan 95 driven by crankshaft 9, to which it is affixed, creates strong draft in 38 and 39 which passes thru shells 101 and cooling fins 102, thence into conduits 43 and 44 and expelled forcefully thru fan case 4. When valves 20, 21, 22, and 23 are open during exhaust-intake stroke of pistons and exhaust ports 87, 88, 89, 90, 91, 92, 93 and 94 uncovered by pistons 12, 13, 14 and 15, there is a simultaneous outrush of exhaust gases thru 43 and 44 and inrush of air thru air scoops 36 and 37 thence thru shells 78, cages 103, ports of valves 20, 21, 22, and 23, cylinders 5, 6, 7 and 8, exhaust ports 87 to 94, conduits 43 and 44 and fan case 4.

Figures 4, 5:
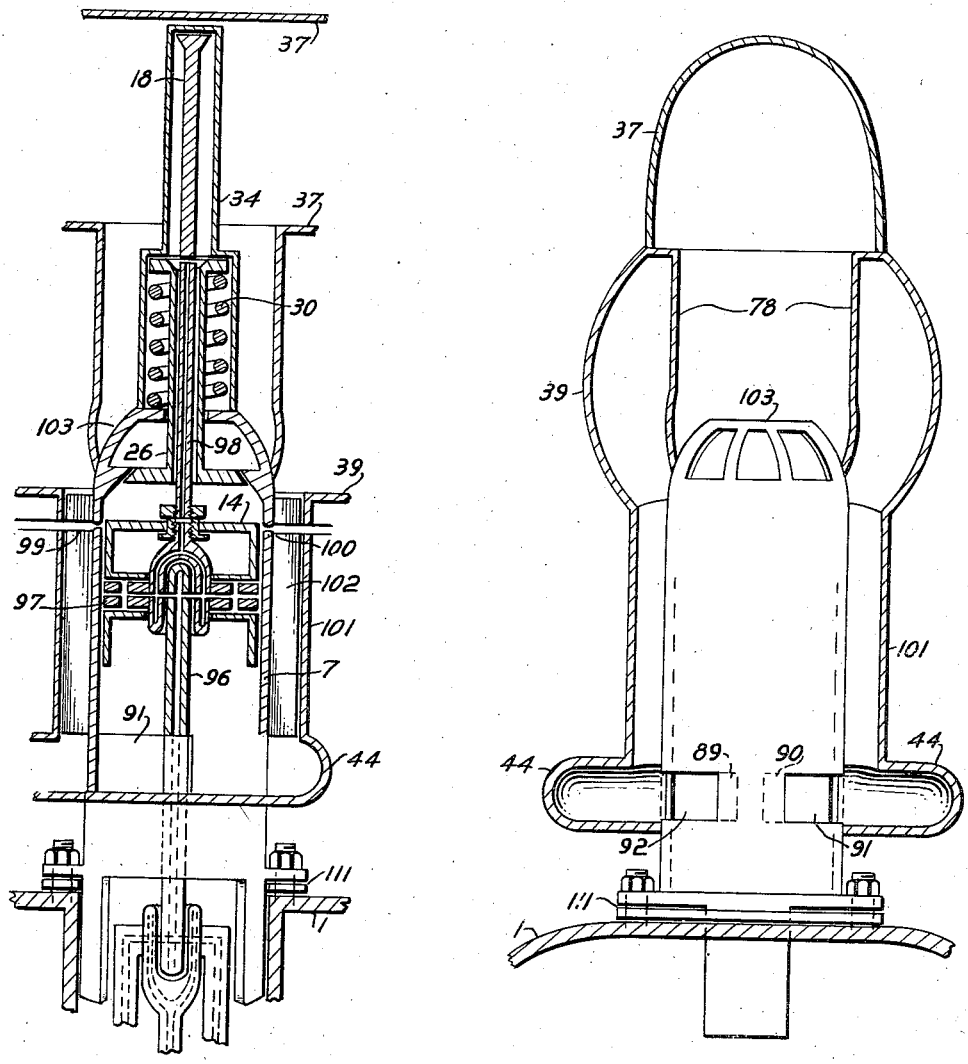
Figure 4 is an enlarged largely sectional view of a cylinder with appurtenant details.
Figure 5 is a rear view of a front cylinder showing arrangement of exhaust ports and exhaust and cooling passages.

Gear 45 mounted on crankshaft 9 at front end of engine drives gear 75 whose shaft drives a centrifugal oil pump 76 which discharges oil drawn from oil pan 2 to center main bearing whence it is passed into the hollow crankshaft 9 and distributed thereby to the other main bearings and to the rifle drilled connecting rods. Referring to Figure 4, detailing a typical cylinder and appurtenances, reference numeral 96 indicates oil duct in connecting rod in which is fitted wrist pin 97 that is drilled longitudinally and diametrically to oil bearing sections of piston 14 and to pass oil into duct 98 of push rod 18 which is drilled diametrically, as shown, so that it emits oil into the conical depression of disk on stem 26 when piston is at top of stroke and at the horizontal centerline of valve 22 when piston and rod are at bottom of stroke and necessarily oils interior of valve stem during ascent and descent. There are orifices of somewhat reduced diameter at ends of longitudinal duct in wrist pin 97 to provide oil jets to cylinder walls.

Figure 5 is offered for the purpose of showing the dual exhaust ports in each cylinder, the solid lines depicting ports of forward cylinders and dotted lines indicating relative positions of cylinders adjacent to fan case. It should be noted that the size of ports, coupled with fan draft, assures fast, complete scavenging.

Figure 6:
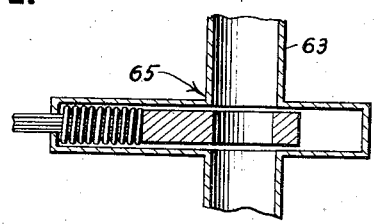
Figure 6 is an enlarged view, partly broken away, of an injector-distributor shown in Figures 1, 2, and 3.

Gear 45 also drives gear 46 having female shaft 57, Figures 3 and 6, which drives an injector 47 and adjunct ignition distributor 48 which appear in Figures 1, 2, 3, the latter revealing operating lever 59 and acceleration pump 52. Various aspects of these units and fuel supply and distribution ducts are shown in all figures of drawings except Figure 5 and reference accordingly made, but more particularly to Figures 6 and 7. A splined shaft 56 is received into the correspondingly milled shaft 57 and thereby driven. Between the splined segment of shaft 56 and cam 55 is a spheruloid 105 which rotates within control block 106 to which is fixed plunger rod of acceleration pump 52. Cam 55 is milled as shown in Figure 7 to receive the splined shaft 104 to which is fitted a distributor arm 61 which contacts lead-in wire from coil with its curved member and diametrically opposed contact points simultaneously with its base arm, thus supplying ignition current to spark plugs 83 and 85 on cylinders 5 and 7 and plugs 84 and 86 on cylinders 6 and 8 alternately as it revolves within distributor case 48.

The injector unit 47 consists of the housing 49 with cylinders 50 and 51 extending laterally therefrom with acceleration pump 52 centrally superimposed on housing 49 at right angles to cylinders 50 and 51. Cylinders 50 and 51 are divided by partitions 107 and 108 respectively with the extreme chambers being the pump sections. Numerals 53 and 54 designate the plungers which each consist of a rod having a head at the extreme end tightly fitted in the pump chamber, a disk which retains one end of a coil spring (109 and 110) with partition (107 and 108) restraining the other spring end, and a socket retaining a ball. As will be noted from Figures 6 and 7, the cam maintains a constant radius while its wheel progressively reduces in circumference so that when said cam 55 is moved to the right, Figure 3, by the action of lever 59 being moved to its dotted line position, plungers 53 and 54, by virtue of tension exerted by springs 109 and 110 increase stroke travel accordingly and thereby enlarge fuel capacity of the pump chambers, thus providing means for controlling discharge rate of the injector to cylinders.

Reference numerals 62 and 63 designate dual fuel supply lines, fitted with valves 64 and 65, detailed in Figure 8, to permit adjustment of relative proportions of volatile and nonvolatile fuel admitted to the common conduit 66 from which branches 67 and 68 convey to cylinders 50 and 51 respectively, while a third duct supplies acceleration pump 52. As hereinbefore set forth, plunger of 52 is attached to control block 106 and as the block is moved to the right, Figure 3, fuel is injected via tubes 73 and 74 into juncture of tubes 67 and 68 with cylinders 50 and 51 respectively. The simplicity of the injector is notably and desirably enhanced by complete elimination of valves. This is accomplished by usage of common intake and discharge channels. On the intake strokes of plungers 53 and 54 the pump chambers fill to whatever extent the stroke length permits and that is the obvious limit. On discharge strokes of plungers the pressure offered by fuel in lines 67, 68, 73, and 74 forces the discharge to follow tubes 69 and 70 leading to cylinders 6 and 8 respectively, and tubes 71 and 72 leading to cylinders 5 and 7 respectively.

As will be seen from Figure 1, the tubes 69 to 72 bifurcate and enter the cylinders at diametrically opposite points thus producing counterblast of the opposing sprays of fuel and thereby effecting faster and better diffusion with the air drawn into cylinders thru valves 20 to 23. Fuel jets 99 and 100 are shown in Fig. 4.

Referring to Figure 5, reference numeral 111 designates a shim plate typical to juncture of each cylinder with crankcase 1, said shim plates also appearing in Figures 1 and 2. Said shims represent, together with the injector system and control of air for combustion mixture by valves 40 and 40A, means of utilizing any type of liquid fuel by varying compression ratio by increasing or reducing thickness of shims. It will be noted from Figure 2 that conduits 43 and 44 have slotted bolt openings to permit adjustment of juncture with fan case 4 corresponding with cylinder position.

This engine being of the two-cycle type, the diagonally opposite cylinders fire simultaneously and power thrusts thereof act against cranks 10 and 11, which are disposed at 180 degrees to each other, thus achieving absolute counterbalance of both power impulses and compression resistance forces in opposed pairs of cylinders. This action not only eliminates torque and vibration but exploits leverage and mechanical resonance, thereby enabling operating speeds of from 8,000 to 10,000 revolutions per minute. It will have been seen from description of the forced fueling and scavenging means hereinbefore set forth that enablement of high speed operation is provided by said means, together with valve action system 20 to 23. As will appear in Figures 1 and 4, the push rods 16 to 19 are secured by wrist pins and piston heads which motivate said rods. When pistons and rods are at top center as in cylinders 5 and 7, Figure 1, and Figure 4, the rods 16 and 18 extend 84.6% of piston stroke length beyond the disks of 24 and 26. Using this position as 0 degrees on the crankshaft revolution circle, the heads on rods 16 and 18 engage the conical depressions in disks of 24 and 26 at 124.62 degrees as said rods travel downward, unseating and opening valves 20 and 22 until the 180 degree position is reached as shown for pistons 13 and 15 and valve 21, Figure 1. As pistons and pushrods are impelled on the upstroke by crankshaft 9 and cranks 10 and 11, spring tension acting on disks of 24 and 26 returns valves 20 and 22 to closure as rod heads on 16 and 18 permit, full closure being reached at 235.38 degrees. It will thus be seen that valve action occupies 110.76 degrees of the revolution circle and 30.8% of stroke travel. It should be noted that the engine shown has a bore to stroke ratio of 8 to 13 and since figures quoted apply specifically to this example this data will vary inversely with stroke length.

As will appear from relative size of combustion chamber to stroke as shown in cylinder 5, Figure 1, and cylinder 7, Figure 4, this engine has a compression ratio of approximately 13 to 1, and, while adjustable thru shims 111 as heretofore set forth to adapt to any liquid fuel, this inventor recommends such ratio and a fuel mixture of distillate, or another non-volatile fuel, with gasoline, kerosene, liquid methane, butane, or other volatile fuel for the reasons that: relatively high operating temperatures permitted by air cooling enables efficient combustion of such mixture; inexpensive fuel reduces operating costs; heat of compression furnishes ignition and obviates dependence upon electrical ignition; fire hazard is reduced; ample lubricant, such as colloidal graphite, may be added to complement oil jets of wrist pins 97 in cylinder wall lubrication. The electrical ignition means are provided to assure utilization of any type of fuel, expedite starting, and to augment compression ignition if and when desired.

From the foregoing description and drawings it is patent that this invention embodies satisfactory means to achieve the objectives set forth in preamble, and altho the engine depicted is primarily intended for propulsion of a rear-engined automobile wherein the exhaust of air and combustion gases provides complementary thrust it is intended for general power plant utility. When used to power aircraft, a propeller, or propellers, would replace the fan 95 and fan case 4. Likewise, the four cylinders represent the basic or minimum number required to provide simultaneous power impulses in opposed cylinders with adequate continuity, and any desired number of additional units may be added, with appropriate arrangement of cranks and additional fueling and ignition means to correlative interspersion of power impulses. Other variations in the form and arrangement of parts beyond the disclosure herein are of course possible and are contemplated in the claims which follow.

I am aware that certain components and arrangements embodied in my concept have been used prior to my invention and accordingly disavow intent of infringement thereunto, but I claim:

1. An internal-combustion engine of the two-cycle type comprising a crankshaft, a crankcase including oil reservoir, a cylinder secured to said crankcase, a piston fitted within the cylinder and acting on and by a crank on said crankshaft thru a connecting rod, an air conduit, having a forwardly faced inlet, attached to cylinder head, means for controlling the volume of air entering said conduit, means for intermittent outlet of air from conduit into cylinder, a port, or ports, so situated in cylinder wall as to be exposed during final phase of piston's downstroke and initial phase of upstroke and occluded by piston during balance of strokes, means for substantially coinciding the opening and closing of cylinder's inlet and outlet means, an exhaust conduit having a rearwardly directed outlet aperture, said exhaust conduit adapted to receive and convey gases from outlet port, or ports, of cylinder, means for creating a forced draft in the air conduit, cylinder, and exhaust conduit when inlet and outlet means of cylinder are open for scavenging of combustious product gases and charging of cylinder with air, means of injecting fuel into cylinder to carburet with air therein to form a combustible mixture, means of igniting said combustible mixture, and means for radiating the heat of combustion from affected parts, including radiating fins on exterior wall of cylinder, an air conduit having a forwardly faced inlet, a shell enveloping said radiating fins and connecting air conduit with exhaust conduit, and means for controlling the volume of air entering said air conduit.

2. An internal-combustion engine of the two-cycle type comprising a crankshaft, a crankcase including an oil reservoir; a plurality of cylinders secured to said crankcase; a piston fitted within each cylinder and reciprocally coacting with a crank on said crankshaft thru a connecting rod; an air conduit, or conduits, having a forwardly faced inlet opening, means for regulating the volume of air entering said conduit, or conduits, a connection for said conduit, or conduits, with head of each cylinder, a valve for each cylinder permitting intermittent passage of air from conduit and connection into cylinder, a port, or ports, so situated in each cylinder as to be exposed during final phase of piston's downstroke and initial phase of upstroke and occluded by piston during balance of travel, means for substantially coinciding the opening and closing of cylinders' inlet and outlet means, an exhaust conduit adapted to receive and convey gases from outlet port, or ports, of each cylinder, means for creating a forced draft rearwardly in air and exhaust conduits and thru cylinders when inlet and outlet valves are open for scavenging of combustious product gases and charging of cylinders with fresh air; means for injecting fuel into each cylinder to carburet with air therein to form a combustible mixture, means for igniting said combustible mixture; means for supplying fuel to the injector means including a pair of fuel lines leading from separate sources of fuel supply, a valve in each fuel line, means for operating each valve independently, a common fuel conduit, a connection for each fuel line with said common conduit, and a connection, or connections, for said conduit with the injector means; means for radiating the heat of combustion from affected parts, including radiating fins on exterior wall of each cylinder, an air conduit, or conduits, a forwardly faced inlet opening for said conduit, or conduits, a shell enveloping said radiating fins for each cylinder and connecting an air conduit with an exhaust conduit, means for propelling, or impelling, air rearwardly in said air and exhaust conduits and said shells, and means for directing efflux from exhaust conduit, or conduits, rearwardly for jet reaction propulsive thrust forwardly including a rearwardly directed jet opening; and means for varying the spaced relation between endophery of each cylinder head and head of its piston when at top dead center including annular shim-plates, whose bore coincides with bore of cylinder, appropriately interposed between cylinder head and crank case.

3. Structure according to claim 1 wherein means are provided for supplying fuel to the injecting means including a pair of fuel lines leading from separate sources of fuel supply, a valve for each fuel line, means for operating each valve independently, a common fuel conduit, a connection for each fuel line with said conduit, and a connection, or connections, for said conduit with the injecting means.

4. An internal-combustion engine of the two-cycle type comprising a crankshaft having cranks relatively disposed at 180 degrees, a crankcase including an oil reservoir; two pairs of cylinders, the components of each pair being diametrically opposed and in axial alinement, and the pairs disposed in parallel relation in same plane, secured to said crankcase; a piston fitted within each cylinder and acting on and by cranks of crankshaft thru connecting-rods, the connecting-rods serving each pair of opposed cylinders bearing on a common crank; an air conduit having a forwardly faced inlet, means for regulating volume of air entering said conduit, a connection with each cylinder head, a valve for each cylinder permitting passage of air from conduit and connection into cylinder, a port, or ports, so situated in each cylinder as to be exposed during final phase of piston's downstroke and initial phase of upstroke and occluded by piston during balance of travel, means for substantially coinciding the opening and closing of cylinder's inlet and outlet means, an exhaust conduit adapted to receive and convey gases from outlet port, or ports, of cylinder, means for creating a forced draft rearwardly in air and exhaust conduits and thru cylinders when valve means are open for scavenging of combustious product gases and charging of cylinders with fresh air; means for injecting fuel into pairs of diagonally opposed cylinders alternately to carburet with the air therein and form a combustible mixture, means of igniting said combustible mixture; means for radiating the heat of combustion from affected parts, including radiating fins on exterior cylinder walls, an air conduit having a forwardly faced inlet, a shell which envelopes said radiating fins and connects said air conduit with the exhaust conduit, which has a rearwardly faced outlet aperture, means for creating a forced draft rearwardly in air conduit, thru shell past radiating fins, and rearwardly thru and out of exhaust conduit; means for lubricating all moving parts and their bearing surfaces, including cylinder walls and valve action, and means whereby power impulses are produced simultaneously in the alternate cylinders in opposite banks and act simultaneously on both cranks of crankshaft, and means for supplying fuel to the injector means including a pair of fuel lines leading from separate fuel supply sources, a valve in each fuel line, means for operating each valve independently, a connection for each fuel line with a common conduit, and a connection, or connections, for said conduit with said injector means.

5. An engine structure according to claim 1, wherein the ducts connecting injection means to cylinder, or cylinders, bifurcate and the furcations of each of said ducts have jet openings into engine cylinder at substantially diametrically opposite points.

6. An engine structure according to claim 1, wherein the means for intermittent outlet of air from air conduit into cylinders and the means for substantially coinciding the opening and closing of cylinder's inlet and outlet means comprises an orifice in cylinder head with a seat adapted to accommodate a circular valve, a cage, including a centrally bored disk having supports providing interstitial apertures, mounted on cylinder head in symmetrical relation to said orifice, a valve having a stem with a disk at its upper terminal, said disk having a conical depression in its head and the several valve components axially bored to accommodate a rod which is centrally anchored to piston head, extends thru and is slidable in valve assembly and terminating in a conoidal head conforming to depression in disk of valve ensemble, and having an axial bore extending from a radial bore so situated that it moves from conical depression of valve disk head thru valve stem into valve head as rod is reciprocated by piston, a connection of said axial bore with oil duct of wrist pin, and a coil spring tensed between top of said cage and disk of valve stem.

7. An engine structure according to claim 1, wherein the compression ratio is variable by means of shims or plates having a circular opening identical with cylinder bore, said shims or plates forming inserts between cylinder, or cylinders, and crankcase.

8. An engine structure according to claim 1, comprising means for ignition by heat of compression including means for regulating volume of air admitted to cylinders for carburetion, means for substantially regulating operating temperature of engine, means for varying compression ratio, and means for supplying fuel to the injector means including a pair of fuel lines leading from separate sources of fuel supply, a valve in each fuel line, means for operating each valve independently, a connection for each fuel line with a common conduit, and a connection, or connections, for said conduit with said injector means.

9. An internal-combustion engine of the two-cycle type comprising a crankshaft whose cranks form pairs, whose components may or may not be adjacent, which extend oppositely in a common plane and which pairs are correlatively disposed to provide uniform intervals therebetween; a crankcase including an oil reservoir; a plurality of cylinders, in multiples of four, arranged in diametrically opposed banks comprising identical numbers of cylinders in axial alinement with their respective opposites, secured to said crankcase; a piston fitted in each cylinder and coacting with a crank of said crank shaft by means of a connecting rod, the connecting rods serving each pair of opposed pistons bearing on a common crank; an air conduit, having a forwardly faced inlet opening, for each cylinder bank, means for regulating the volume of air entering said conduits, a connection for each cylinder head with its respective air conduit, a valve for each cylinder permitting intermittent passage of air from conduit and connection into cylinder, a port, or ports, so situated in each cylinder as to be exposed during final phase of piston's downstroke and initial phase of upstroke and otherwise occluded by piston, means for substantially coinciding the opening and closing of cylinder's inlet and outlet means, an exhaust conduit, having a rearwardly directed outlet, or outlets, adapted to receive and convey gases from outlet port, or ports, of cylinders, for each cylinder bank, means for creating a forced draft rearwardly in said air and exhaust conduits and thru cylinders when valve means are open for scavenging of combustious product gases and charging of cylinders with fresh air; means for injecting fuel simultaneously into pairs of cylinders, whose components lie in opposite cylinder banks and whose pistons coact with cranks extending oppositely in a common plane, to carburet with the air therein and form a combustible mixture; means for igniting said combustible mixture simultaneously in said opposed pairs of cylinders; means for radiating the heat of combustion from affected parts including, radiating fins on the exterior wall of each cylinder, an air conduit, having a forwardly faced inlet opening and means for controlling the volume of air entering therein, for each cylinder bank, a shell which envelopes said radiating fins and connects the air and exhaust conduits for each cylinder bank respectively, means for creating a forced draft rearwardly in said air conduits, thru shell past radiating fins, and rearwardly thru and out of exhaust conduits; means for varying the spaced relation, uniformly for all cylinders, between the interior of each cylinder head and its piston when at top dead center including annular shim-plates, whose bores coincide with cylinder bores, appropriately interposed between each cylinder and its head, or between each cylinder and the crankcase; and means for supplying fuel to the injector means including a pair of fuel lines leading from separate sources of fuel supply, a valve in each fuel line, means for operating said valves independently of each other, a common fuel conduit, a connection for each fuel line with said conduit, and a connection, or connections, for said common conduit with the fuel injecting means.

10. Structure according to claim 9 wherein said cylinder banks are disposed to form a dihedral angle whose degree is identical with that of the angle of crank unit relativity and the sector of crankshaft revolution described during interval between power impulses.

11. An internal-combustion engine of the two-cycle type comprising, a crankshaft, a crankcase including oil reservoir, a plurality of cylinders extending radially from said crankcase to form a plurality of diametrically opposed pairs, a piston fitted within each cylinder and coacting with a crank on said crankshaft by means of a connecting-rod; an air conduit, or scoop, communicating with each cylinder head, means for regulating the volume of air entering said conduits, or scoops, a valve for each cylinder permitting intermittent passage of air from conduit, or scoop, into the cylinder, a port, or ports, so situated in each cylinder as to be exposed during final phase of piston's downstroke and initial phase of upstroke and otherwise occluded by piston, means for substantially coinciding opening and closing of the inlet and outlet valves for each cylinder, an exhaust stack, having a rearwardly directed outlet opening, adapted to receive and convey gases from outlet port, or ports, of cylinders, means for creating a forced draft rearwardly in said air and exhaust conduits and thru cylinders when valve means are open for scavenging combustious product gases and charging cylinders with fresh air; means for injecting fuel simultaneously into pairs of opposed cylinders to carburet with the air therein to form a combustible mixture, means for igniting said combustible mixture in opposing pairs of cylinders simultaneously; means for radiating the heat of combustion from affected parts; means for altering the ratio of compression for said cylinders uniformly including annular shim-plates, whose bore coincides with cylinder bore, interposed between each cylinder and its head, or between each cylinder and the crankcase; and means for supplying fuel to the injector means including a plurality of fuel supply lines, each leading from a separate source of fuel supply, a valve for each fuel line, means for operating said valves independently of each other, a common fuel conduit, a connection for each fuel line wtih said conduit, and a connection, or connections, for said conduit with the fuel injecting means.

12. Structure according to claim 1 wherein the exhaust conduit is provided with a rearwardly directed jet opening, and wherein means are provided for propelling, or impelling, air rearwardly in both of said air conduits, thru said shells externally past cylinder, internally thru cylinder when inlet and outlet means thereof are open, for propelling, or impelling, exhaust gases and coolant air rearwardly in said exhaust conduit and expelling same from said jet opening for producing a jet reaction propulsive effect forwardly.

JOHN LEWIS HAIGHT, Jr.